United States Patent
Russ, Sr.

[11] 3,829,055
[45] Aug. 13, 1974

[54] MOLD FOR LOCATING TRANSVERSE REINFORCEMENTS IN ENDLESS TRACK

[75] Inventor: Paul E. Russ, Sr., Englewood, Colo.

[73] Assignee: The Gates Rubber Company, Denver, Colo.

[22] Filed: July 21, 1972

[21] Appl. No.: 273,919

[52] U.S. Cl. .................................................. 249/91
[51] Int. Cl. ............................................ B22d 19/02
[58] Field of Search ......... 249/91, 150, 177, 83, 86, 249/90; 425/110, 117, 119, 121, 123, 124, 28, 28 B, 28 D, 20, 127, 128, 129, 468, 112, 115, 46, 32; 305/51

[56] References Cited
UNITED STATES PATENTS

| | | | |
|---|---|---|---|
| 1,502,272 | 7/1924 | Sayre | 249/96 X |
| 2,027,651 | 1/1936 | Penardi | 249/91 |
| 2,591,430 | 4/1952 | Hawkinson | 425/20 |
| 2,602,188 | 7/1952 | Gorecki | 425/28 B |
| 2,619,678 | 12/1952 | Crooker | 425/46 X |
| 2,644,984 | 7/1953 | Crooker | 425/20 |
| 2,658,238 | 11/1953 | Rizzo | 249/96 X |
| 3,074,112 | 1/1963 | Bobrow | 249/83 X |
| 3,081,497 | 3/1963 | Scherry | 249/96 X |
| 3,109,202 | 11/1963 | Beckadolph | 425/128 |
| 3,134,143 | 5/1964 | Ludewig | 249/91 X |
| 3,283,053 | 11/1966 | Felker | 425/123 X |
| 3,441,321 | 4/1969 | Darland | 305/51 X |
| 3,454,992 | 7/1969 | Santelmann | 425/119 |

Primary Examiner—J. Spencer Overholser
Assistant Examiner—John S. Brown
Attorney, Agent, or Firm—H. W. Oberg, Jr.; Raymond Fink; Curtis H. Castleman, Jr.

[57] ABSTRACT

A mold for endless track of the polymeric type. The mold includes small protuberances in the mold concavities for positioning, transversely aligning, and spacing stiffening members of generally rod shape. The stiffeners are preferably prepositioned in a spaced apart manner on a textile strip during the process of track assembly. The stiffeners are held in proper position while the polymer of the track is cured.

6 Claims, 4 Drawing Figures

MOLD FOR LOCATING TRANSVERSE REINFORCEMENTS IN ENDLESS TRACK

BACKGROUND OF THE INVENTION

The invention relates to wheel substitute land vehicles, but more particularly, the invention relates to molds and processes for locating and aligning stiffening rods in integrally molded track.

Stiffening rods are advantageously used to transversely reinforce integrally molded track for track laying vehicles such as snowmobiles. Examples of stiffening rods appear in U.S. Pats. Nos. 2,899,242 and 3,598,454. It is important that the rods be properly aligned and spaced for smooth operation of the track. Where the rods are not properly spaced, they may cause interference with a drive wheel or sprocket and make the track rough running. When the rods are obliquely aligned as compared to transversely, in relation to the track, longitudinal flexibility of the track may be greatly impaired.

SUMMARY OF THE INVENTION

A mold is provided for integrally forming endless track for track laying vehicles. The mold includes a plurality of protuberances of predetermined spacing and size within the mold concavity. The protuberances position, hold and align a plurality of stiffening rods transversely in a spaced manner while polymeric material of the track is cured. The stiffening members are preferably prepositioned on and attached to a textile strip during the fabrication process to facilitate handling and alignment.

Accordingly, it is an object of the invention to provide a mold having means for transversely aligning stiffening members in an integrally molded track during the fabrication or curing process.

Another object of the invention is to provide a track fabrication process that facilitates accurately aligning stiffening transversely within an integrally molded track.

These and other objects or advantages of the invention will be more apparent after reviewing the drawings and description thereof wherein.

DESCRIPTION OF PREFERRED EMBODIMENT

Figure 1:
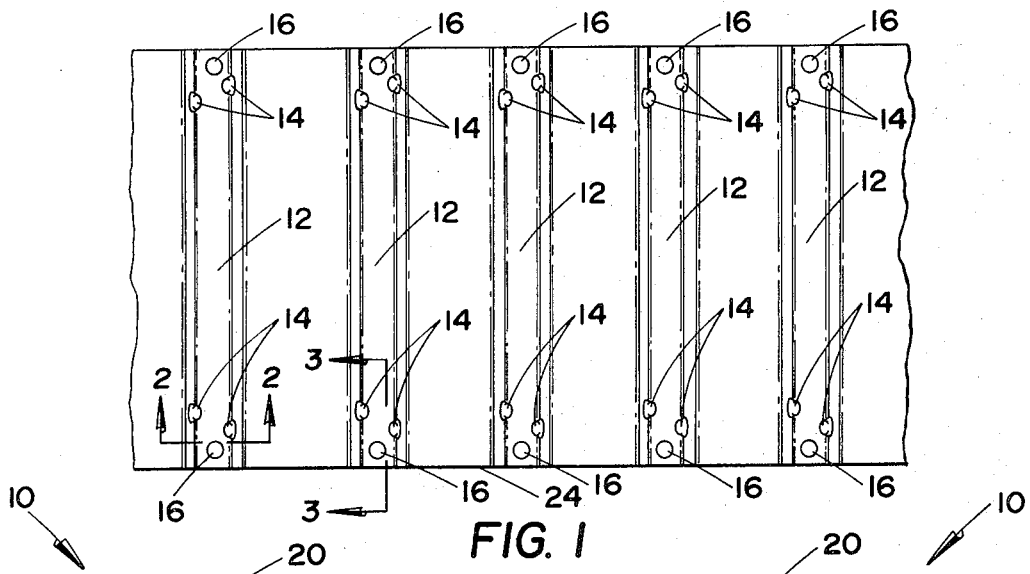
FIG. 1 is a plan view showing a portion of a mold concavity that includes protuberances of the invention for aligning stiffeners.
Figures 2, 3:
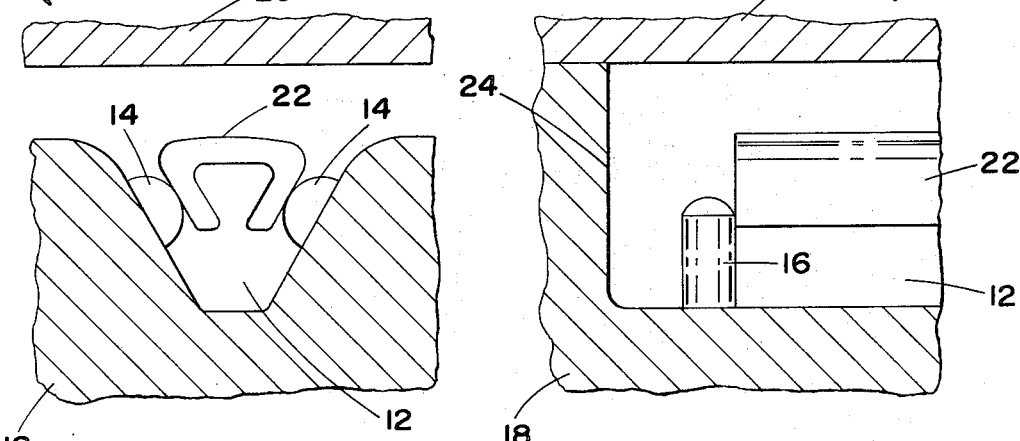
FIG. 2 is an enlarged view taken along the line 2—2 of FIG. 1 of a mold concavity showing a stiffener in aligned position.
FIG. 3 is an enlarged view taken along the line 3—3 of FIG. 1 showing a stiffener aligned in the mold.

Referring to FIGS. 1 through 3, a mold 10 is provided in accordance with the invention that includes concavities having a plurality of small protuberances or projections 14, 16 of predetermined size and spacing. One portion 18 of the mold defines the concavity 12 for shaping the outer surface of a track while another portion 20 of the mold defines a concavity for shaping a track inner surface. A tread portion for a track is defined on one portion 18 of the mold and a drive receiving portion for the track is defined on the other portion 20 of the mold. An open-end or continuous type mold may be used. Open-end molds are generally planer and find prevalent use for forming integrally molded rubber track whereas continuous or generally cylindrical shell molds find prevalent use for forming integrally molded polyurethane track.

The tread cavity 12 of the mold typically includes a tread bar portion that extends continuously and transversely of the mold. Smaller tread cavities, not shown, are usually arranged in some longitudinal pattern along the mold. It is desirable that a track for track laying vehicles have a large degree of transverse stiffeners and a much lesser degree of longitudinal stiffeners. Transverse stiffeners establishes a somewhat flat and stable platform for operation for a track laying vehicle. Longitudinal flexibility allows a track to be bent and trained around small diameter wheels of a track drive means. It is important that the tread elements and reinforcements of the track be positioned in such a manner to enhance transverse stiffeners without impairing longitudinal flexibility. Similarly, it is important that any stiffener of high modulus be aligned accurately in a transverse manner to minimize impairment of longitudinal flexibility.

Stiffening rods, hereinafter referred to as stiffeners, may be disposed anywhere within the track body. Preferably, the stiffeners 22 are disposed in the transverse tread bar portion 12 since in this location a larger and higher strength stiffener may generally be used that imposes affect on longitudinal flexibility. Principles herein disclosed for aligning a stiffener in a tread bar concavity equally apply for locating and aligning stiffeners within the body cavity of a mold.

Preferably, two aligning protuberances 14 extend into the tread bar concavity near each edge portion 24 thereof. The aligning protuberances 14 extend into the mold a predetermined amount and in such a manner that their innermost end portions are in transverse and spatial alignment within the mold concavity 12. The aligning protuberances 14 may be of any desired size and shape to complement the shape of the stiffener to be used. Whenever an aligning protuberance occurs in the mold, there is a corresponding indentation in the track being formed. Because of this, it is preferably to have the aligning protuberances very small, and just large enough to support the stiffeners. Also, it is preferable to have the individual aligning protuberances 14 offset laterally from each other to avoid having closely spaced indentations in a finished track.

Protuberances of almost any shape may be used to align a stiffener transversely within the mold. Only one aligning protuberance near each end portion is needed for transverse alignment. However, oftentimes it is also desirable to orient a stiffener within the mold. Orientation is accomplished by making the stiffener and protuberances define a complementary wedging action. For example, the stiffener 22 being used may have generally an oval U, or vee outer shape and the protuberances 14 may be of general cylindrical or spherical shape such that the stiffener 22 nests between the protuberances 14 much like a vee belt nests in a sheave. The physical arrangement may be reversed so the aligning protuberances define a vee shape to nest in a grooved rod. Optionally, additional spaced protuberances 16 may be used in the tread bar concavity 12 to center the stiffeners laterally in the mold. The spacing between a pair of centering protuberances 16 is slightly larger than the maximum length of the stiffener 22. A single larger protuberance near the edge of each tread bar concavity could be used to align and center the stiffener, but the single protuberance is least desirable as it displaces too much polymeric material leaving larger voids in a finished track.

Figure 4:
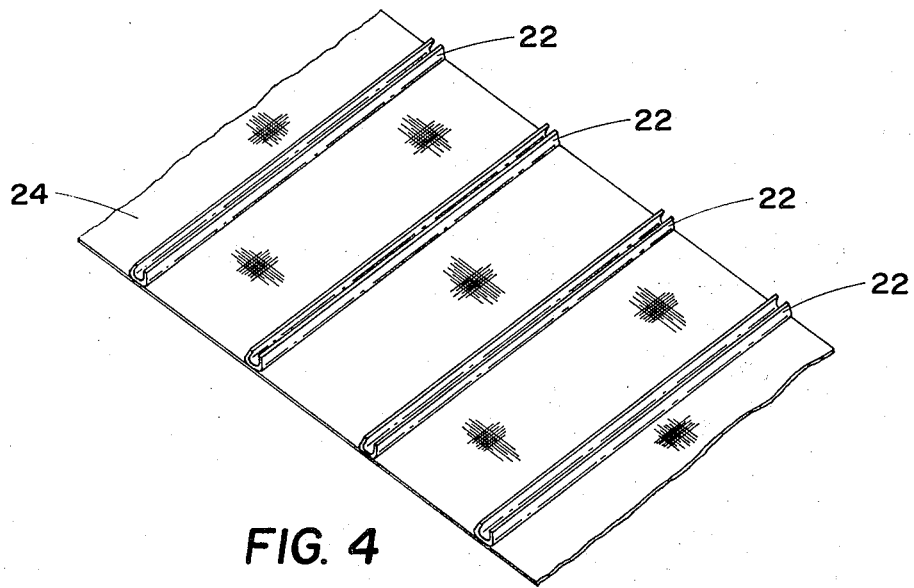
FIG. 4 is an isometric view showing stiffeners prepositioned and held in place on a flexible strip.

When track is fabricated in accordance with the preferred process of the invention, a plurality of stiffeners 22 are prespaced in generally parallel alignment using any desirable means. For example a parallellally grooved table or cylinder may be used in cooperation with an automatic stiffener feeding mechanism. Referring to FIG. 4 the prespaced stiffeners 22 are attached preferably with an adhesive to at least one flexible strip 24 having a length preferably about equal to the circumference of the track to be fabricated. The strip may be of the elastic type; however, it is desirable that the strip be a textile reinforcement that can be used in the track fabrication process. The strip 24 advantageously holds and prepositions a plurality of stiffeners for easy and convenient reception within the mold cavity.

The protuberances 14, 16 properly position the stiffeners 22 within the mold whether a solid forming or liquid forming polymer is to be used. When a rubber track is to be made, it is typical to ply together several layers of uncured rubber and textile reinforcement. The strip with the stiffeners attached thereto is easily used as if it were an ordinary reinforcement ply. The uncured or green track is placed in the mold. As the mold is closed, pressure and temperature is applied to the track. The pressure causes the rubber to flow forming desired patterns on the track inner and outer surfaces. The protuberances 14, 16 are forced into the track nesting the stiffeners 22 in proper position. The compressive pressure of the mold is sufficient to rotate the stiffeners into proper angular position within the mold because of the vee nesting feature of the protuberances, the rubber is cured under temperature and pressure.

When a track is to be made of a castable liquid such as polyurethane it is typical to first ply up a desired textile material to define and endless reinforcement and then add and cure the castable polymer. The strip 24 with stiffeners 22 attached thereto is easily used as if there were an ordinary reinforcement ply. A tensile member is spirally wound under tension over the stiffeners firmly nesting them in proper orientation within the mold. Castable liquid polymer is added filling the mold concavities. The stiffeners are locked in proper position in the track once the polymer is cured.

The foregoing detailed description is made for purpose of illustration only and it is not intended to limit the scope of this invention which is to be determined from the appended claims.

What is claimed is:

1. A mold for laterally aligning and embedding a plurality of longitudinally spaced generally rigid stiffeners generally of straight rod shape transversely within an integrally molded endless track comprising:
   a first mold half with longitudinal and transverse axes that correspond to axes of the track and having concavities defining a desired longitudinal and generally flat transverse shape for an inner surface of a generally flat track;
   a second mold have having transversely oriented and substantially straight stiffener receiving concavities and concavities defining a desired longitudinal and generally flat transverse shape for an outer surface of a generally flat track, the second mold half oppositely facing toward and spaced from the first mold half in longitudinal and transverse alignment therewith, the spacing and concavities defining a major mold cavity that is generally flat in transverse cross-section; and
   a plurality of small protuberances extending from at least one mold half into the stiffener receiving concavities a predetermined amount, the protuberances longitudinally spaced in groups in relation to the mold halves, the groups including at least two lineally aligned and generally transversely spaced protuberances located near edge forming concavities of the mold and arranged and adapted to receive, spatially support, and position end portions of the stiffeners transversely in a wedging fashion within and substantially transversely across the major cavity spacing the stiffeners away from the mold halves.

2. A mold for aligning and embedding a plurality of longitudinally spaced generally rigid stiffeners generally of straight rod shape transversely within an integrally molded endless track comprising:
   a first mold half with longitudinal and transverse axes that correspond to axes of the track and having concavities defining a desired longitudinal and generally flat transverse shape for an inner surface of a generally flat track;
   a second mold half having longitudinally spaced and generally straight tread bar concavities arranged transversely and concavities defining a desired longitudinal and generally flat transverse shape for an outer surface of a generally flat track, the second mold half oppositely facing toward and spaced from the first mold half in longitudinal and transverse alignment therewith, the spacing therebetween defining a major mold cavity that is generally flat in transverse cross-section; and
   at least two transversely spaced and lineally aligned pairs of stiffener supporting protuberances extending into each tread bar concavity a predetermined amount, the transverse spacing between two pairs being less than the length of a stiffener, and the protuberances of each pair being longitudinally spaced and adapted to support a stiffener transversely in a wedging fashion in spatial alignment spaced away from the mold halves within each tread bar concavity.

3. A mold as set forth in claim 2 and further including two spaced, stiffener end locating protuberances extending into each tread bar concavity a predetermined amount, the spacing being greater than the length of each stiffener.

4. A mold as set forth in claim 2 wherein the protuberances of each pair are transversely spaced from each other.

5. A mold as set forth in claim 2 wherein said mold halves are generally concentric cylinders.

6. A mold as set forth in claim 2 wherein said mold halves are of the open end type.

* * * * *